United States Patent [19]
Benisek

[11] 3,781,126
[45] Dec. 25, 1973

[54] TURBOCHARGER COMPRESSOR WITH DUAL INLET AND COLLECTOR CHAMBERS

[75] Inventor: Edward F. Benisek, Indianapolis, Ind.

[73] Assignee: Wallace-Murry Corporation, New York, N.Y.

[22] Filed: June 15, 1972

[21] Appl. No.: 263,009

[52] U.S. Cl.............. 415/143, 417/407, 415/178, 60/13
[51] Int. Cl. .................... F04d 1/10, F04d 29/58
[58] Field of Search................. 415/143, 74, 219 C, 415/178

[56] References Cited
UNITED STATES PATENTS
| | | | |
|---|---|---|---|
| 2,563,270 | 8/1951 | Price | 415/143 |
| 3,143,103 | 8/1964 | Zuhn | 415/143 |
| 3,233,866 | 2/1966 | Daviolovic | 415/143 |

FOREIGN PATENTS OR APPLICATIONS
| | | | |
|---|---|---|---|
| 499,357 | 1/1939 | Great Britain | 415/178 |

Primary Examiner—Henry F. Raduazo
Attorney—Cameron, Kerkam, Sutton, Stowell & Stowell and Thomas J. Greer, Jr.

[57] ABSTRACT

Disclosed is a single stage, centrifugal compressor component of a turbocharger for an internal combustion engine in which the vanes of the compressor wheel are formed to provide frontal vane portions extending radially beyond the adjoining vane portions. The intake for the compressor is formed to provide dual, discrete intake passages, one for the radially extending vane portions and one for the adjoining vane portions. An internal wall of the compressor wheel cover forms two discrete chambers or passages, one accommodating air flow induced by the radially extending vane portions, the other accommodating flow induced by the adjoining vane portions. The dual flow paths thus provided through the compressor component permits drawing cool, ambient air through an externally located heat exchanger and then into the intake of one compressor flow path, this air flow passing in heat exchange relation to the high pressure air output of the other compressor flow path. The cooled high-pressure air output, is injected as charge air into the air induction system of an internal combustion engine.

4 Claims, 5 Drawing Figures

TURBOCHARGER COMPRESSOR WITH DUAL INLET AND COLLECTOR CHAMBERS

BACKGROUND OF THE INVENTION

The desirability of reducing the temperature of super-charging air before its introduction into the intake of an internal combustion engine is well known. U.S. Pat. No. 3,143,103 discloses a multi-stage turbocharger compressor having a separate, axial-flow stage for providing cooling air to an external heat exchanger through which passes the high pressure, high temperature air for charging the engine. The maintenance of maximum oxygen content per unit volume of charging air, as pointed out in the above mentioned patent, is an important advantage of charge air cooling, however, the more recent concern with reduction of undesirable engine exhaust emissions makes such treatment of the engine charging air a matter of increasing interest for transport and industrial diesel engine users and manufacturers. Lower combustion temperatures, in general, produce lower toxic nitrogen oxide exhaust emissions, and since cooling the engine charging air provides lower combustion temperatures, providing a compact, efficient charge air cooling turbocharger compressor assembly is a matter of growing urgency and importance.

The concept of utilizing radially extending frontal vane members with the compressor housing divided into two separate collector chambers is disclosed in Woolenweber patent application Ser. No. 202,136, filed Nov. 26, 1971 now abandoned and assigned to the assignee of the present application. The concept of the present invention differs in that two discrete flow paths, including dual intake passages, are provided for the compressor component of the turbocharger. This has an advantage in that it permits the compressor to draw air from atmosphere into an external heat exchanger, or intercooler, and pass the high pressure output of the compressor in heat exchange relation with the cooling air flow. Thermal transfer occurs in the heat exchanger before the cooling air has passed through the compressor and thus before its temperature has been raised by compression. More efficient cooling of the separately channeled (through the compressor and heat exchanger) engine charge air is thus achieved and the external heat exchanger can be of reduced size.

DESCRIPTION OF THE PREFERRED EMBODIMENT

Figure 1:
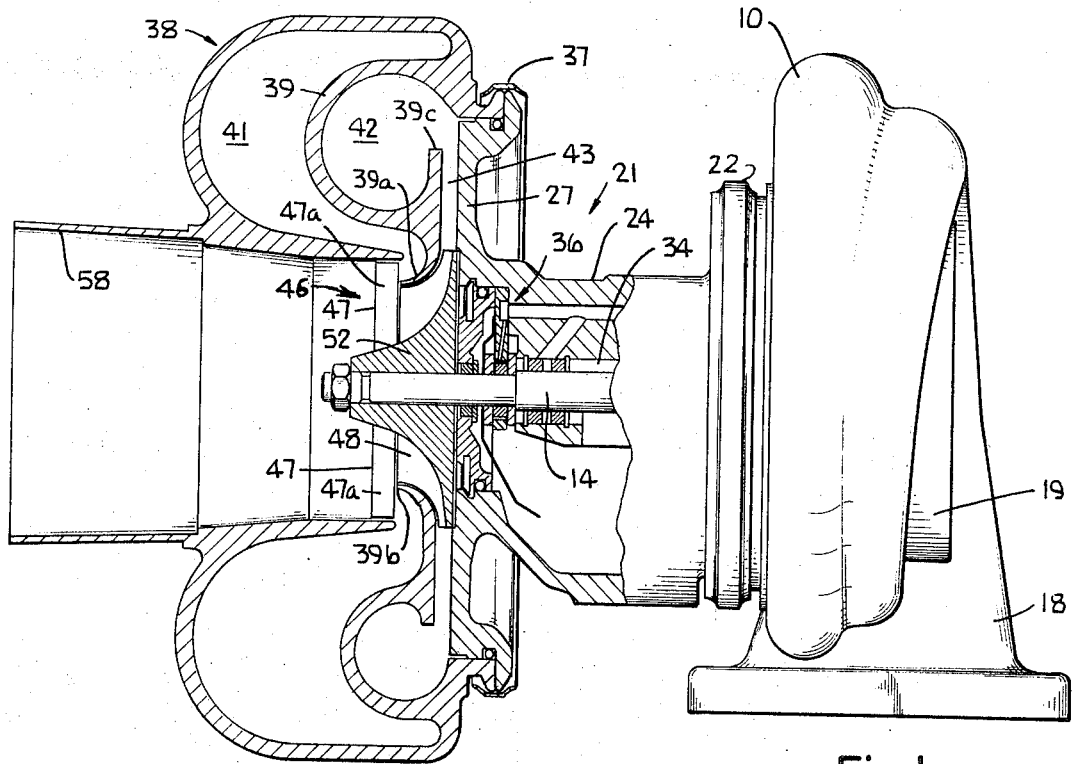
FIG. 1 is a side view, partially in section, of a turbocharger in which a portion of the inlet passage has been elongated to accomodate the dual inlet forming means shown in FIG. 3.
Figure 2:
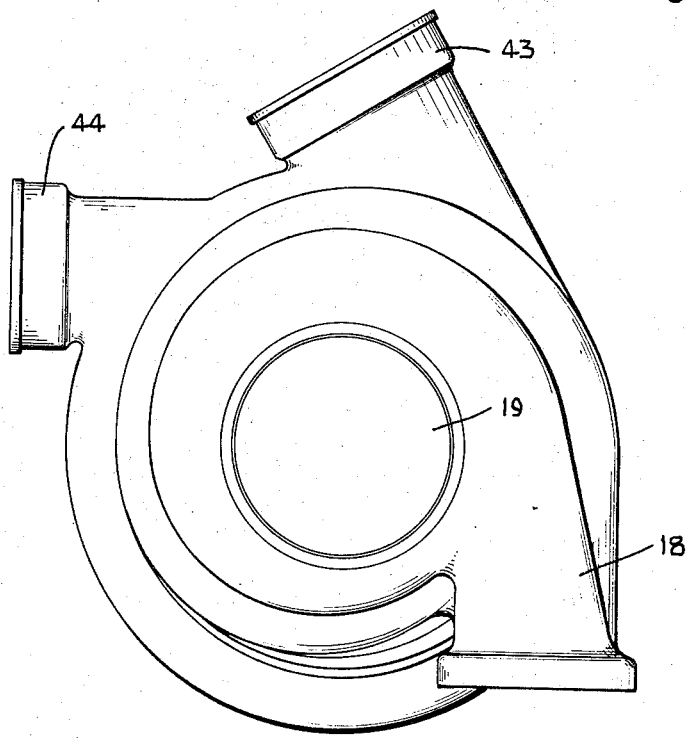
FIG. 2 is an end view of the turbocharger shown in FIG. 1.

Referring initially to FIGS. 1 and 2, there is illustrated an exhaust gas driven turbocharger which is composed of a turbine housing 10 enclosing a conventional bladed turbine wheel (not shown) which drives the shaft 14. The turbine housing is provided with a flanged inlet passage 18 which transmits engine exhaust gases to the turbine wheel. The turbine component itself is of conventional construction. High pressure gases, entering the turbine, are expanded through the turbine wheel, causing the shaft 14 to rotate at high speed. The spent gases are discharged through the turbine outlet passage 19.

Attached to the turbine housing casting 10 is an intermediate casting 21, the casting 21 and the turbine housing 10 being held in sealed relation by means of clamp ring 22. The casting 21 is nonsymmetrical in configuration and includes a central portion 24 and an outwardly flanged portion 27. The central portion 24 of the casting 21 is provided with a central aperture 34 through which the shaft 14 extends. Within this aperture the portion 24 carries rotary and thrust bearings indicated generally at 36 which permit free rotation of the shaft.

Secured to the flanged portion 27, by means of clamp ring 37, is a compressor cover casting indicated generally at 38. Extending within, and integral with the cover casting 38 is a curved wall 39. The wall has extending portions 39a which define the circular, common boundary 39b between two chambers 41 and 42.

Chamber 41 encircles the compressor wheel, to be subsequently described in detail, and forms a generally annular collector area whose outlet is formed at the tangentially extending outlet passage 43 (FIG. 2). As may be seen in FIG. 2, the chamber 42 forms a volute-type collector and diffuser passge. An extending portion 39c of the wall 39 provides the narrow diffuser passage 43 extending generally radially from the tips of the compressor wheel vanes. The volute chamber of passage 42 has its outlet at the tangentially extending outlet passage 44 (FIG. 2).

The extending, reduced diameter portion of the shaft 14 supports a centrifugal type compressor wheel indicated generally at 46 carrying a plurality of radially extending vanes. As may be seen in FIGS. 1 and 4, the vanes each have a frontal portion 47 leading, or in front of, the adjoining vane portions 48. The frontal portion 47 of each of the vanes has a radially extending portion 47a which extends radially beyond the adjoining vane portion 48 and, it will be noted, the circular common boundary between the chambers 41 and 42 is located adjacent the junction of the radially extending frontal portions 47a and the adjoining vane sections 48. The vanes are carried by a hub portion 52 supported on the shaft 14. It will be understood that the edges of the vane frontal portions 47 engage the edges of the adjoining vane portions 48 and the bucket-forming curvature of the vanes extends continuously and smoothly across both the radially extending frontal vane portions 47 and the adjoining vane portions 48. A portion of the compressor inlet passage is formed by the cylindrical elongation 58 of the casting 38.

Figure 3:
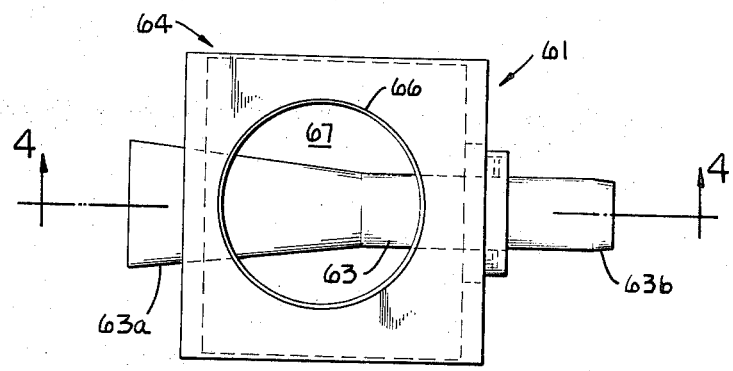
FIG. 3 is a top plan view of an entry housing forming the dual inlet path for the compressor component of the turbocharger.
Figure 4:
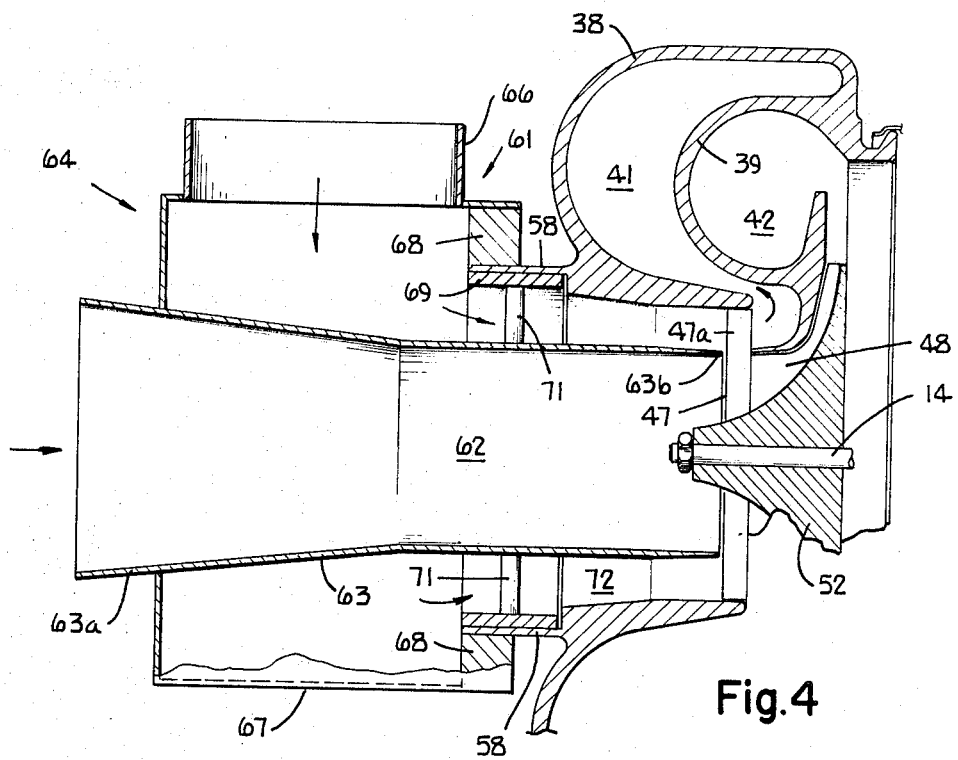
FIG. 4 is a side sectional view showing the inlet housing of FIG. 3 installed on the compressor component of FIG. 1, and taken generally along the line 4—4 of FIG. 3.

Referring to FIGS. 3 and 4, it will be evident that the elongated cylindrical portion 58 of the casting 38 is accomodated within and secured to a compressor entry housing indicated generally at 61. The entry housing has a first, or inner tubular passage 62 formed by the cylindrical members 63 which is conically formed at the air inlet end 63a and, at its inner end 63b, terminates closely adjacent the junction of the radially extending vane portions 47a and the adjoining vane portions and is aligned with the margin 39a of the common boundary 39 between collector chambers 41 and 42.

The member 63 extends centrally through a generally rectangular outer housing 64, having a cylindrical intake portion 66 and a closed base 67. The member 63 accomodates an annular portion 68 (FIG. 4). The annular portion 68 overlies the extending portion 58 of the casting 38 and rigidly clamps portion 58 against the flat, circular member 69 which is supported by four posts 71, circular in cross-section, only two which are visible in FIG. 4. The housing component 64 with the adjacent portion of casting 38 thus provide a second, or outer tubular inlet passage 72 (FIG. 4) which has an intake 76 transverse to the axis of the first passage 62. The diameter of this second tubular inlet passage 72 is at least equal to, and preferably substantially the same as, the tip-to-tip diameter of the frontal vane portions 47 including their radially extending portions 47a. When the compressor wheel is rotated at high speed, as will be evident from FIG. 4, air will be drawn through the inlet 66 by the motion of the radially extending vane portions 47a, drawn through the passage 72 and delivered to the collector chamber 41, to be dumped to atmosphere through outlet 43 (FIG. 2). A discrete path for air entering at 63a (FIG. 4) is established by passage 62, this air being compressed by the portions of the compressor wheel adjacent to the extending portions 47a and is delivered at relatively high pressure and temperature to the collector chamber 42.

Figure 5:
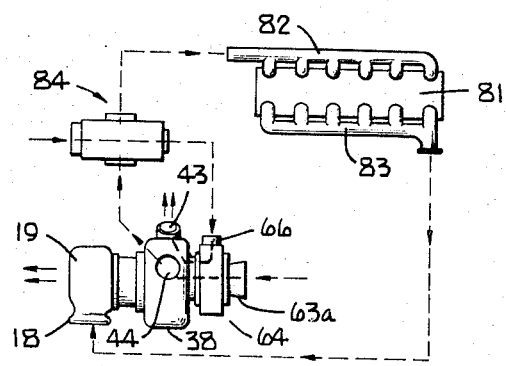
FIG. 5 is a schematic illustration of the turbocharger of FIGS. 1-4 incorporated into a system utilizing an external heat exchanger and providing for the air charging of an internal combustion engine.

FIG. 5 illustrates the incorporation of the dual flow passage compressor into an internal combustion engine turbocharging system. An internal combustion engine is shown schematically at 81, having an intake manifold 82 and an exhaust manifold 83. Exhaust gases from manifold 83 are expanded through the turbine component, thereby driving the compressor wheel previously described with reference to FIGS. 1 and 4.

A heat exchanger is schematically illustrated at 84 and high pressure, elevated temperature air is directed from collector chamber 42 (FIG. 4), through outlet 44 (FIG. 2) and through the heat exchanger. Cooling air is drawn through the other path in the heat exchanger and directed to the inlet 66, this air being moved by the radially extending portions 47a of the compressor wheel and dumped to atmosphere through the outlet 43. In moving through the heat exchanger the relatively cool air drawn from atmosphere cools the high pressure, high temperature charge air for the engine, assuring that the charge air enters the engine at reduced temperature. The advantages of maximum oxygen content per unit volume of charging air and lower combustion temperatures, as previously mentioned, are thus obtained. Since the cooling air flows through the heat exchanger before the heat of compression has been added to it by the compressor wheel, heat exchange occurs at improved efficiency between the two heat exchange paths through the heat exchanger 84. While the entry housing 64 has been described as a component separable from the compressor housing 38, it will be understood that these might be integrally formed.

I claim:

1. A turbocharger compressor of the centrifugal type having a compressor wheel rotated by a drive shaft and a cover enclosing said wheel, the compressor being provided with an intake passage aligned with the shaft axis, said compressor wheel having radially extending vanes thereon for moving air axially through said intake passage and impelling it radially outwardly transverse to said shaft axis, said vanes each having a frontal portion extending radially beyond the adjoining vane portion, a wall within said cover defining two concentric discrete collector chambers surrounding said wheel, said wall extending to provide a circular common boundary between said two chambers closely adjacent the junction of said radially extending frontal portion and the said adjoining portion of said vanes, said intake passage being formed by a compressor entry housing having a first tubular passage terminating closely adjacent the said junction of said radially extending frontal portion and the said adjoining portion of said vanes and being aligned with said circular common boundary of said compressor wheel cover, a second tubular passage in said entry housing having a diameter at least equal to the tip-to-tip diameter of said frontal vane portions, said passages having separate inlet entry openings and thereby defining separate discrete air supply passages to said compressor wheel permitting said radially extending frontal portion of the vanes to draw air through said second tubular passage and move it into one of said collector chambers and permitting the said adjoining portions of the vanes to draw air through said first tubular passage and move it into the other of said collector chambers.

2. A turbocharger compressor as claimed in claim 1 in which said first and second tubular passages are concentric and said first tubular passage extends through said second tubular passage.

3. A turbocharger compressor as claimed in claim 2 in which said first tubular passage is provided with a convergent nozzle configuration within said second tubular passage.

4. A turbocharger compressor as claimed in claim 1 in which the entry opening for said first tubular passage is aligned with the axis of rotation of said compressor wheel and the entry opening for said second tubular passage is transverse to the axis of rotation of the compressor wheel.

* * * * *